Figure 1:
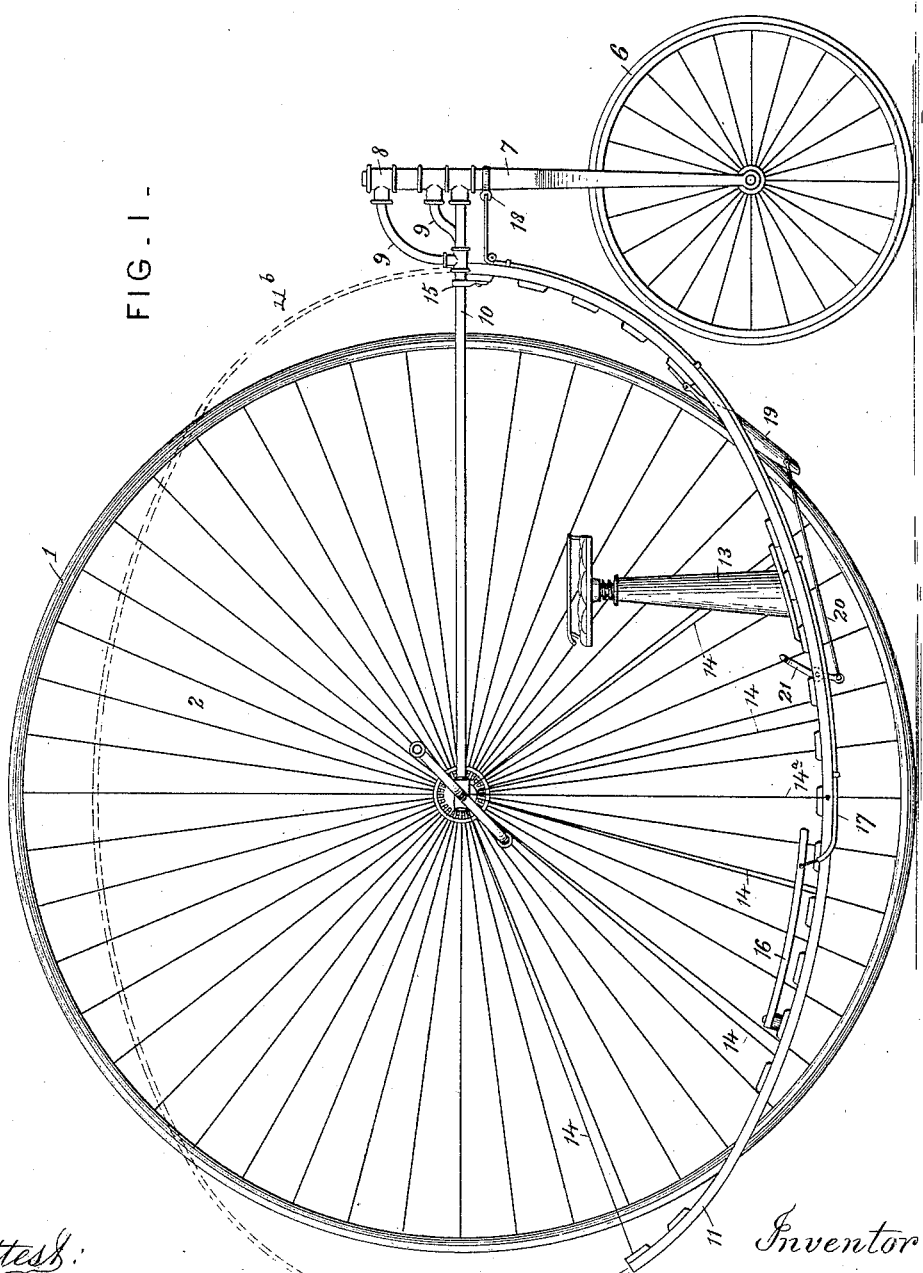

(No Model.) 3 Sheets—Sheet 1.
N. N. HORTON.
BICYCLE.

No. 431,895. Patented July 8, 1890.

Attest:
Geo. T. Smallwood.
Samuel H. Knight

Inventor
N. N. Horton
By Knight Bros.
Attys (No Model.) 3 Sheets—Sheet 2.
N. N. HORTON.
BICYCLE.
No. 431,895. Patented July 8, 1890.
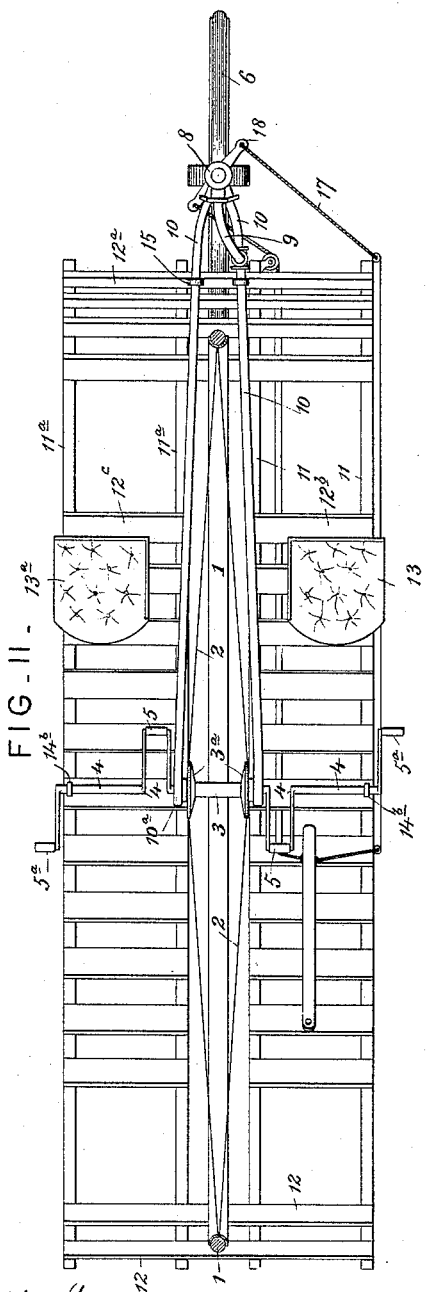
FIG. II.
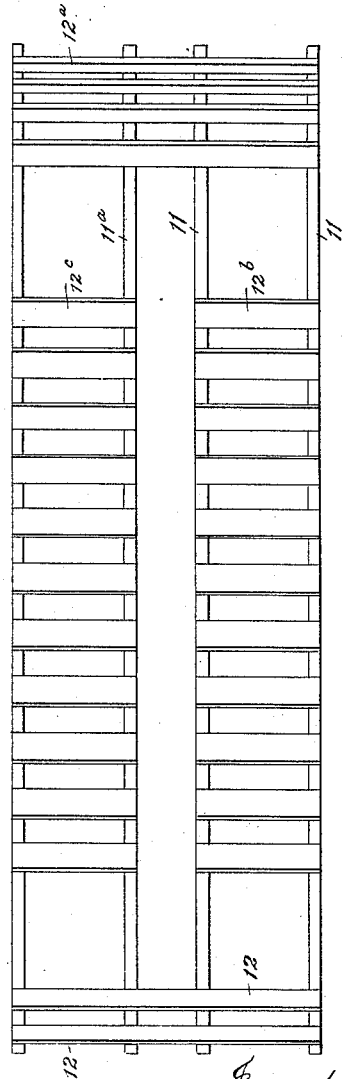
FIG. III.
Attest:
Geo. T. Smallwood,
Samuel H. Knight
Inventor:
N. N. Horton,
By Knight Bros. Attys (No Model.)  3 Sheets—Sheet 3.
N. N. HORTON.
BICYCLE.
No. 431,895. Patented July 8, 1890.
FIG. IV.
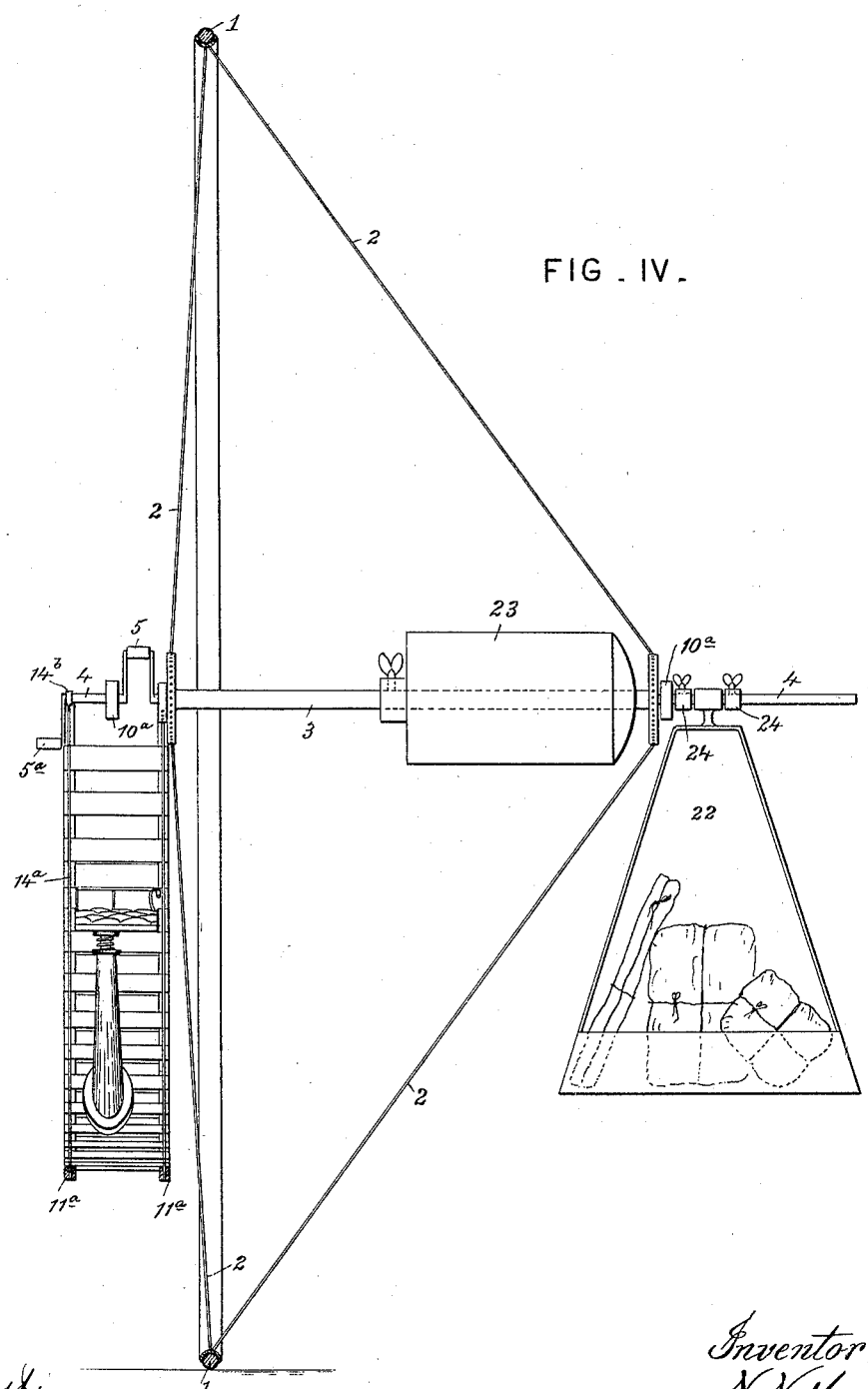
Attest:
Geo. T. Smallwood.
Samuel H. Knight.
Inventor:
N. N. Horton
By Knight Bros
Attys.
THE NORRIS PETERS CO., PHOTO-LITHO., WASHINGTON, D. C.

UNITED STATES PATENT OFFICE.

NUMON N. HORTON, OF KANSAS CITY, MISSOURI.

BICYCLE.

SPECIFICATION forming part of Letters Patent No. 431,895, dated July 8, 1890.

Application filed October 25, 1889. Serial No. 328,112. (No model.)

*To all whom it may concern:*

Be it known that I, NUMON N. HORTON, a citizen of the United States, residing at Kansas City, in the county of Jackson and State of Missouri, have invented certain new and useful Improvements in Bicycles, of which the following is a specification.

The subject of my invention is a bicycle adapted for the use of two or more riders, or for one rider, and a counter-balance on opposite sides of the main driving-wheel. It is constructed with a single light and fast-running wheel with a suspended seat frame or basket extending on both sides of said wheel and connected in front and behind by suitable cross-ties or stretchers, the said basket-carrying seats or stands for two or more riders on opposite sides of the wheel, so that they will counterbalance one another.

The invention further consists in combining with a bicycle and a seat-frame suspended from the central shaft a seat or stand for the rider or riders on one side and a load-support on the other, adjustable in or out with respect to the wheel, so that it may be set close to the wheel when heavily loaded and at a distance from the wheel when light, in order to counterbalance the weight of the rider or riders on the opposite side.

The invention further consists in making a bicycle with a main driving-wheel approximately triangular in cross-section—that is to say, with the spokes more nearly vertical on one side than the other—in combination with a suspended seat or stand for the operator on the straight side of the wheel and an adjustable counterbalance weight on the convex or conical side.

In order that my invention may be fully understood, I will proceed to describe it with reference to the accompanying drawings, in which—

Figure I is a side elevation of my improved bicycle. Fig. II is a plan or top view showing the drive-wheel in horizontal section. Fig. III is a plan of the basket or seat frame detached. Fig. IV is a vertical section illustrating a modification in which a load-support is suspended adjustably on one side of the wheel to counterbalance the weight of the rider or riders on the other side.

Referring to the drawings, 1 represents the rim, 2 the tension-spokes, and 3 the hub of a bicycle drive-wheel, which may be of ordinary or any suitable construction.

4 is a crank-shaft keyed within the hub in the usual manner, so as to drive the wheel. The said crank-shaft extends to a sufficient length on each side of the wheel to be formed into two cranks 5 $5^a$, which cranks I preferably adapt for manual use for the reason that my improved bicycle enables the user to ride near the ground with his arms at or even below the level of the crank-shaft.

The guide-wheel 6 is arranged in rear or front of the main driving-wheel, as preferred, and is mounted in customary manner in a fork 7, the shaft of which is swiveled within a sleeve or bearing 8, connected by suitable braces 9 to a horizontal bifurcated frame 10, having at the extremities of its forks suitable heads $10^a$ to hold the boxes or bearings of the shaft 4. This frame 10 and its connections, if made of metal, may be made hollow for lightness and rigidity.

The suspension-basket or carrying-frame on which the riders sit or stand is preferably made with four parallel ribs 11 $11^a$, of bent wood, two on each side of the wheel, connected at their extremities by cross-bars or stretchers 12 $12^a$, passing in front and rear of the wheel, respectively. The one pair of ribs 11 on one side of the wheel are connected by flooring-bars $12^b$, and the other pair $11^a$ on the opposite side by similar flooring-bars $12^c$. These flooring-bars $12^b$ and $12^c$ afford convenient stands for riders on each side of the wheel, and the system admits of the use of a wheel of very large size, so as to bring the cranks 5 $5^a$ within convenient reach of a man standing erect.

I further provide seats 13 $13^a$ for the riders, one or more on each side of the wheel. If more than one ride on each side of the wheel they preferably stand or sit face to face, so that all may assist in driving.

The seat-frame or basket, constructed as above described, is suspended by rods 14, extending from its front and central portions to suitable flanges upon the heads or boxes $10^a$, by which the guide-wheel frame 10 is journaled on the driving shaft or axle 4. The rear end of the suspended seat-frame or basket is securely hung by suitable eyes 15 directly to the arms of the bifurcated guide-wheel frame 10. An additional suspension-wire 14$^a$ on each side is connected from a sleeve or eccentric 14$^b$ near the end of the crank-shaft 4, to the rib 11 or 11$^a$ of each basket, so as to stiffen the basket and brace it against the weight of a person stepping near the outer edge.

The steering is effected by treadles 16, connected by rods or cords 17, passing through suitable guides on the seat-frame ribs 11 to customary cross head or arms 18 on the shaft of the guide-wheel fork 7. 19 represents the brake, operated by a rod 20 and a foot-lever 21.

If desired, the ribs 11 of the suspended load-frame may be extended completely around in elliptical form, as shown by dotted lines at 11$^b$ in Fig. I.

When used by two or more riders on opposite sides of the wheel, these naturally counterbalance one another when their weights are unequal by the lighter party riding at a greater distance from the wheel and the heavier party near the same. The improved bicycle is thus well adapted for fancy and rapid riding by athletes and others who can dispense entirely with seats and use wheels of very large size, bringing the crank-shaft within convenient reach of their hands.

When the bicycle is intended for the use of a single rider on one side of the wheel, the shaft on the other side may be made straight, dispensing with the hand-cranks, and on this straight end of the shaft I mount an adjustable counterbalance-weight. I prefer in this case to construct the wheel as illustrated in Fig. IV, with one side flat, or nearly so, and the cone or hub projection mainly on the other side. I am thereby enabled to bring the weight of the rider closer to the plane of the wheel-tread and correspondingly reduce the weight of the adjustable counterbalance-load.

In Fig. IV, 22 represents a hanging basket adapting my improved bicycle for messenger and business purposes, said basket being adjustable outward and inward by means of shifting-collars 24, provided with set-screws, so that the load may be made to counterbalance the weight of the driver, the basket being set farther out when the load therein is light, and farther in when it is heavy.

When it is not desired to provide a basket for carrying parcels, &c., as shown at 22, an adjustable counterbalance-weight 23 may be placed on the shaft within the wheel and set toward or away from the rim to balance the weight of the rider.

It is manifest that a load-frame or counterbalance-weight of either form may be used on each side of the wheel outside the hub when cranks are provided for riders on both sides, such counterbalance-weights being employed to compensate for inequality in the weight of the riders.

Having thus described my invention, the following is what I claim as new therein and desire to secure by Letters Patent:

1. A bicycle having a large drive and ground wheel constructed with a suspended seat-frame for supporting riders or other loads on opposite sides of the wheel, substantially as explained.

2. The combination of the driving-wheel 1 2 3 and suspended seat-frames 11 12, consisting of suitable ribs connected by brace frames or stretchers in front and rear and on opposite sides of the wheel, substantially as shown and described.

3. The combination of the wheel 1 2 3, suspended load-frame 11 12, and crank-shaft 5 5$^a$, substantially as and for the purposes set forth.

4. The combination of the driving-wheel 1 2 3, guide-wheel and frame 6 7 8 9 10, and load-frame 11 12, suspended from the frame 10 of the guide-wheel, substantially as herein shown and described.

5. A bicycle constructed with a drive-wheel, a suspended load-frame on opposite sides of the said wheel, and one or more shifting or adjustable load-supports for the reception of a variable weight, substantially as and for the purposes set forth.

6. A bicycle constructed with a main driving-wheel flat, or nearly so, on one side and with the hub projection chiefly on the other side, in combination with a support for the rider on the flat side of the wheel and a counterbalance-load on the conical side separate from the working or running parts.

7. A bicycle constructed with a main driving-wheel flat, or nearly so, on one side, the conical projection mainly on the other side, a suspended support for the rider on the flat side, and an adjustable counterbalance-weight on the shaft within the wheel, substantially as herein described.

NUMON N. HORTON.

Witnesses:
OCTAVIUS KNIGHT,
HERVEY S. KNIGHT.